July 30, 1946.  S. PILE  2,404,885
CONVEYER
Filed Nov. 17, 1944  5 Sheets-Sheet 1

Inventor:
Sydney Pile

July 30, 1946.      S. PILE      2,404,885
CONVEYER
Filed Nov. 17, 1944      5 Sheets-Sheet 2

July 30, 1946.   S. PILE   2,404,885
CONVEYER
Filed Nov. 17, 1944   5 Sheets-Sheet 3
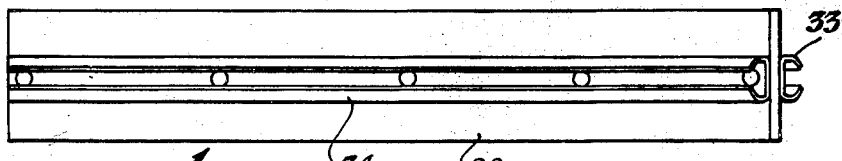
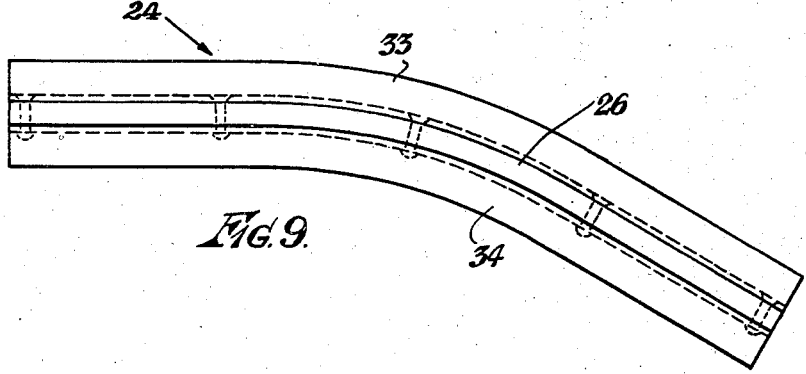
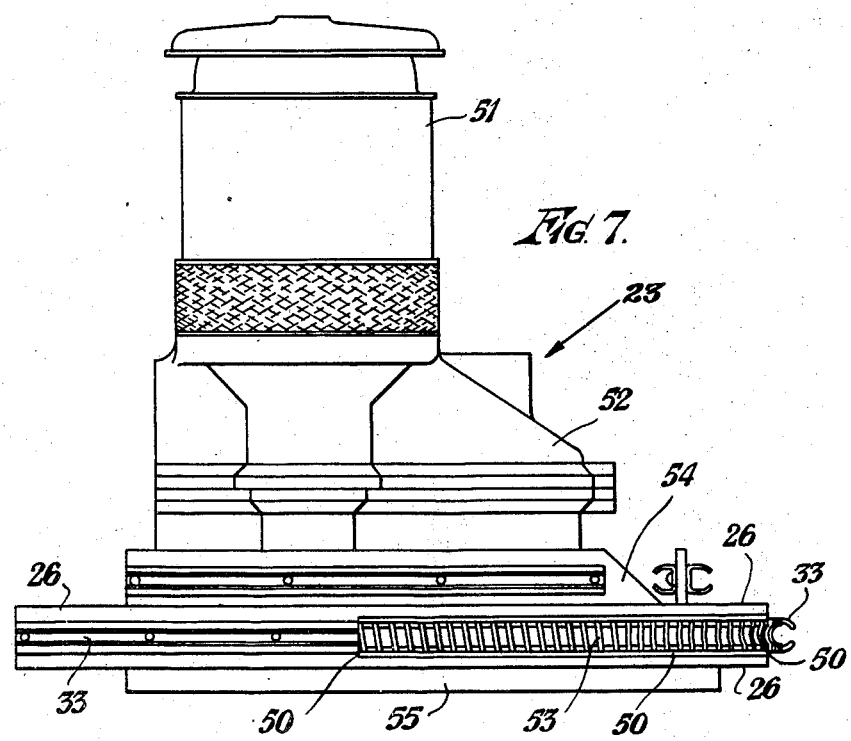

July 30, 1946.                    S. PILE                    2,404,885
CONVEYER
Filed Nov. 17, 1944            5 Sheets-Sheet 4
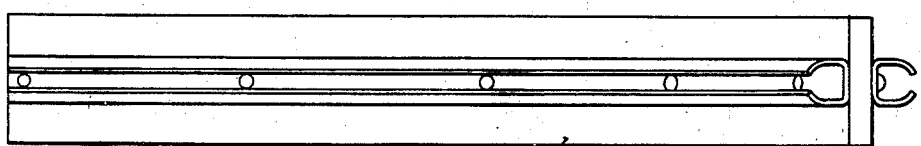
FIG. 10.
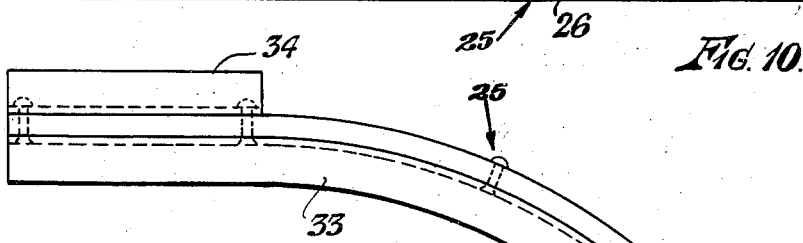
FIG. 11.
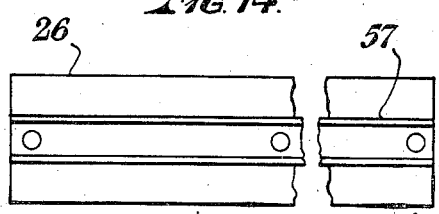
FIG. 14.
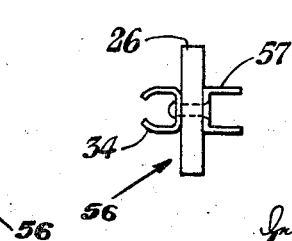
FIG. 15.
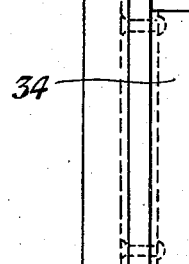
Inventor:
Sydney Pile,
by Singer, Ehlert, Stern
& Edelberg, Attorneys.

July 30, 1946.   S. PILE   2,404,885
CONVEYER
Filed Nov. 17, 1944    5 Sheets-Sheet 5
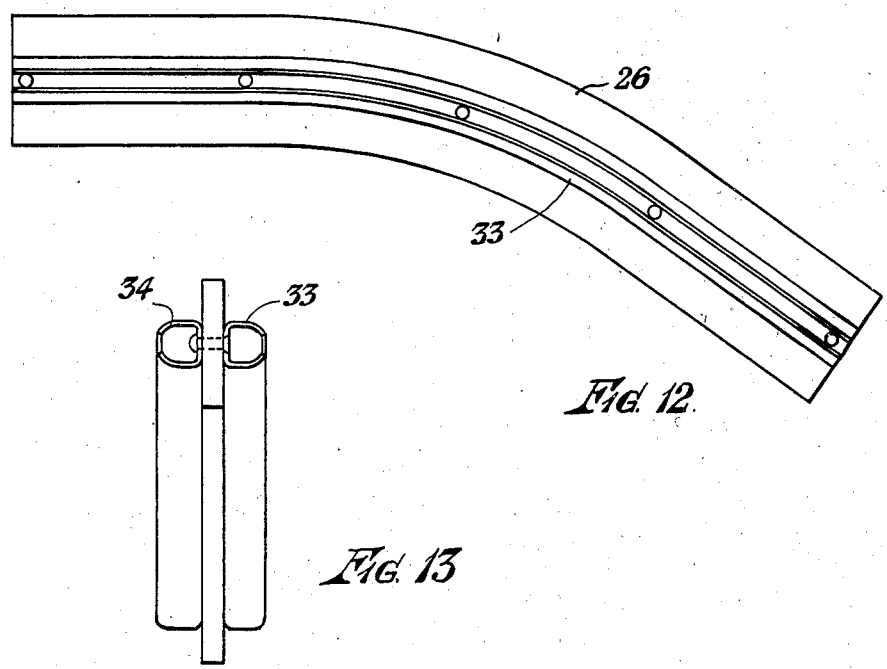
Fig. 12.
Fig. 13.
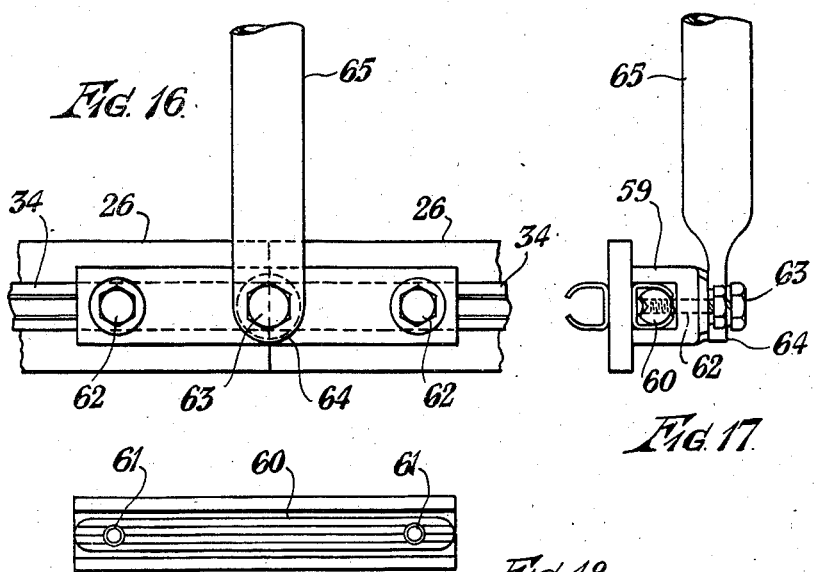
Fig. 16.
Fig. 17.
Fig. 18.
Inventor:
Sydney Pile
by Singer, Ehlert, Stern
& Carlberg, Attorneys.

Patented July 30, 1946

2,404,885

UNITED STATES PATENT OFFICE 2,404,885

CONVEYER

Sydney Pile, London, England, assignor to Teleflex Products Limited, London, England, a British company Application November 17, 1944, Serial No. 563,857
In Great Britain October 11, 1943

8 Claims. (Cl. 198—177)

This invention relates to conveyers and has for its object to provide such devices of simple construction, which are easily operated and suitable for a great variety of purposes.

In mechanical remote control devices for the transmission of pull, push and torsion it is known to provide multi-stranded cables having a single- or multi-start helix projecting on the outer surface thereof to form spaced projections to mesh with gear wheels, nut members or otherwise, which wheels or members either impart the necessary movements to the cable in the transmitting position or receive movements from the cable in the remote or transmitted position, the cables being located to work within a conduit or tube of fixed length, straight or with bends as required, which conduit is slotted in desired positions to permit the engagement of the gear wheels, nuts or other members with the cable.

Cables of the kind concerned are for example described and shown in the specification of United States Patent No. 1,983,962.

According to the present invention such multi-stranded flexible cables with spaced helical wires which project on the exterior are mounted for the whole or part of their length in a slotted conduit or split housing of suitable section so that they can move longitudinally in such conduit or housing, or can rotate in such conduit, or can move both longitudinally and rotate therein, or where unconfined by the conduit can move, or rotate, with or without extraneous supporting means.

Means, such for example as a driven gear wheel or gear wheels with suitable teeth in suitable relation with the slotted conduit or otherwise, are provided to engage the helical projections on the cable and by their drive to cause the said cable to move longitudinally, or again, the cable may be caused to rotate by any suitable means, or it may be caused to move both longitudinally and to rotate by any suitable means, for example an engaging nut member caused to rotate but held from longitudinal movement.

Whatever the arrangement may be, there are provided in addition any desired number of co-operating members, hereinafter termed carrier assemblies, of suitable material and formation which extend to engage the movable cable. The cable thus imparts movement to the said assemblies and such include a wheel or wheels to roll upon the conduit itself (where provided) or a rail or rails in association with the cable and/or conduit, which wheel or wheels have a carrier pendant therefrom or otherwise associated therewith of any suitable construction and shape for the support of the goods, articles or the like to be conveyed.

In some cases carriers may have such formation that they readily can be placed on or taken off the conveyer in any suitable position automatically to come into driving engagement with or to be disengaged from the cable.

Generally the cables and their conduits or split housings (where provided) and, if employed, associated rail or rails, are endless and the longitudinal drive imparted to the cable from a suitable gear wheel in at least one position from a motor, for example an electric motor, through reduction gearing. Where the drive is from more than one position, the drives can be synchronised in any suitable manner. Further, it will be understood that the whole conveyer system is suitably supported, for example by hanging ties, brackets, standards or otherwise, with any suitable beams, cross or other ties, struts or otherwise.

In order that the invention may be better understood, it will now be described with reference to the accompanying drawings which are given by way of example, which show a complete conveyer system together with the details thereof, already constructed according to the invention to give satisfactory and efficient service, and in which.

Fig. 7 an elevation of the drive unit,

Fig. 8 an elevation and Fig. 9 a plan of a runway assembly for a corner where the split housing and cable have an angle of more than 180°, Fig. 10 an elevation and Fig. 11 a plan of a runway assembly for a corner where the split housing and cable have an angle of less than 180°, Fig. 12 an elevation and Fig. 13 a side elevation of a runway assembly to accommodate rises and falls in the run of the conveyer, Fig. 14 an elevation and Fig. 15 a side elevation of a runway assembly having a special part to replace the split housing to permit the jointing of the cable in the primary set-up of the conveyer, Fig. 16 an elevation and Fig. 17 a side elevation of a joint assembly for sections of the runway together with suspending means for the conveyer, and finally Fig. 18 an elevation of a portion of the joint assembly detached.

Figures 2, 3:
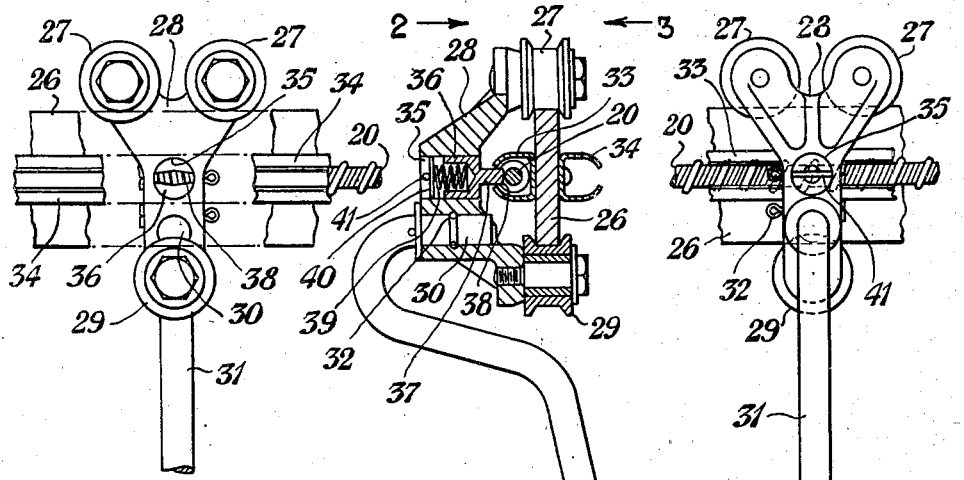
Figure 1:
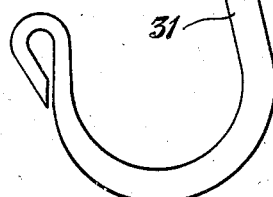
Fig. 1 is an elevation partly in section of the conveyer runway with associated split housing for the cable, together with a co-operating carrier assembly, Fig. 2 a side elevation in the direction of the arrow 2, Fig. 1, and Fig. 3 a side elevation in the direction of the arrow 3, Fig. 1, with portions broken away.

The cable utilised in the conveyer shown in the drawings is in accordance with the specification of United States Patent No. 1,983,962 and the portion of such cable appearing in Figs. 1, 2 and 3 is designated by the reference numeral 20. In the actual example as constructed and operating, the cable has an outside diameter of ½", that is to say, this is the extreme outside diameter taken over the projecting helices. It will be understood, however, that in accordance with particular circumstances, the cable can have a greater or less diameter. The cable is made endless, that is, its ends are jointed as hereafter explained, its length being in accordance with the particular layout.

The conveyer in accordance with the invention, shown in the drawings, is made up from a plurality of runway sections, straight or bent (according to their positions) which have riveted thereto the split housing for the cable, which sections are arranged to abut and in the abutting positions are united by suitable joints to form a continuous runway, certain corner sections having combined therewith freely running corner wheels for guiding the cable around the corner and one corner section having combined therewith the drive unit which includes a driven toothed wheel for engaging the helical projections of the cable to cause the movement of the cable.

Figure 4:
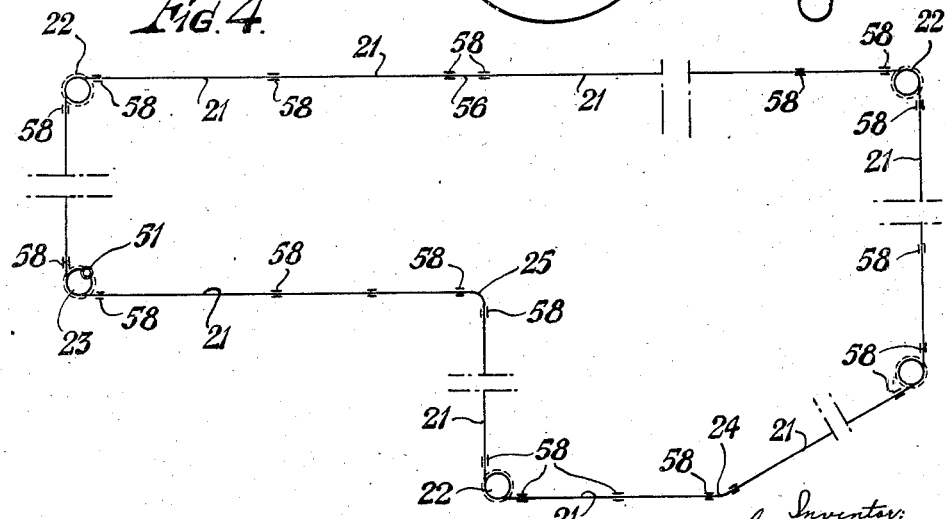
Fig. 4 is a diagrammatic plan of the conveyer layout (one of many) to indicate the various details of the conveyer system and their relative positions, the said details being shown fully in the subsequent figures of the drawings.
Figure 6:
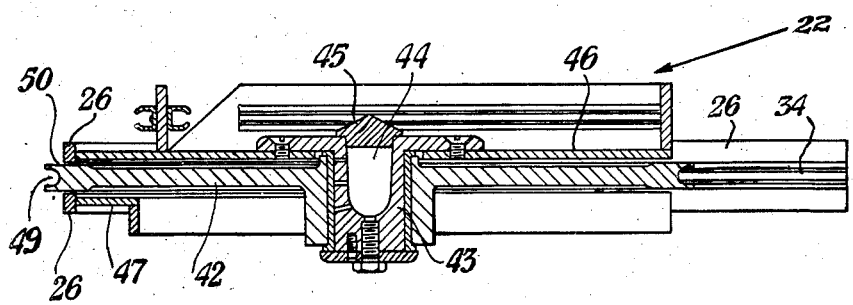
Figure 5:
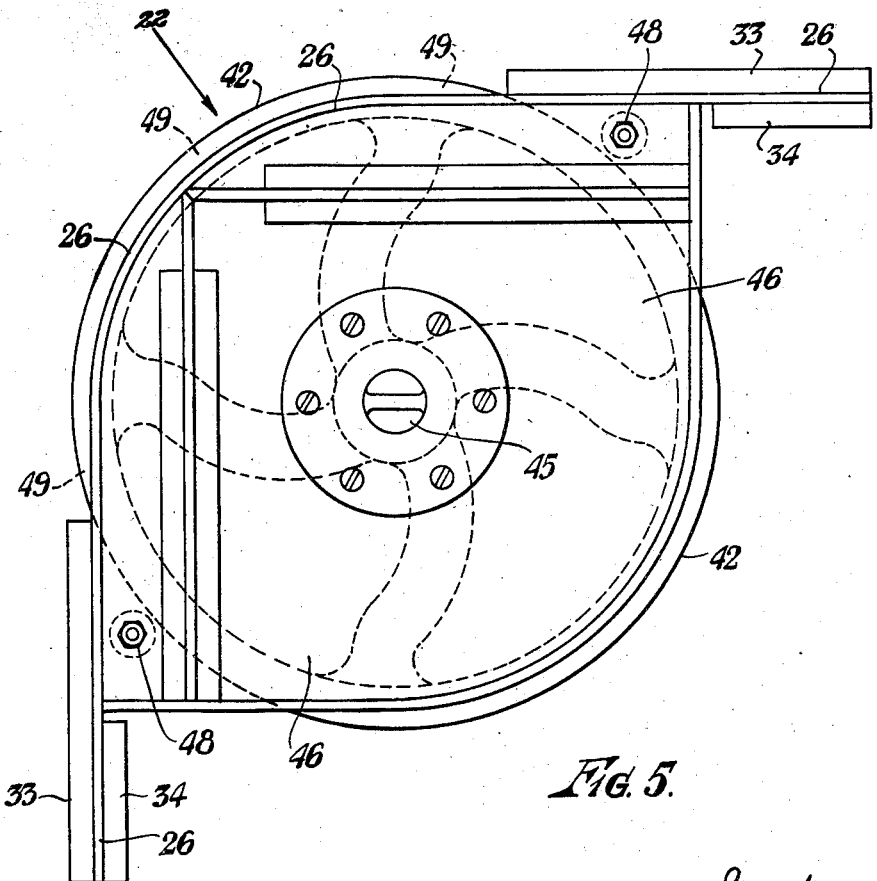
Fig. 5 is a plan and Fig. 6 a sectional elevation of a corner wheel assembly.

The conveyer actually in plan can have any desired layout to suit the particular conditions and Fig. 4 is only an exemplification thereof which it is thought will show all the variations to make up such a layout. That is to say, an ordinary layout can be comprised by any desired number of straight runway sections 21, corner wheel assemblies 22 such as shown in Figs. 5 and 6, a drive unit 23 such as shown in Fig. 7, corners 24 of a runway assembly for such corners where the cable must pass through an angle greater than 180° such as shown in Figs. 8 and 9, and a corner 25 of a runway assembly for the case in which the cable must pass through an angle less than 180°, as exemplified in Figs. 10 and 11.

In all cases the conveyer comprises a runway 26 of rectangular section with the longer side vertical, the section being such that its upper edge can be run upon by wheels or rollers 27 mounted in the upper part of a bracket constituting a runner 28, the lower part of which runner has a positioning and steadying wheel 29 mounted thereon to engage the lower part of the runway 26. The bracket or runner 28 has a bearing towards the lower part thereof in which is mounted so as to be free to turn the spindle portion 30 of a pendant conveyer hook 31, the parts being kept in position by a split pin 32 tangentially engaging in a groove in the spindle portion 30. Moreover the disposition of the parts is such that the hook 31 to carry the load causes this load to hang substantially in the plane of the runway 26.

33 is a housing, of somewhat D-shaped section except that there is a gap at the central portion of the curve, to constitute a split housing. This split housing has such internal dimensions that it forms a running conduit for the cable and although the cable is confined therein and thereby, it freely can be moved longitudinally thereof. In all positions a portion of the surface of the cable comes adjacent the split or slot in the housing 33. 34 is a split housing similar to 33 and the runway 26 together with the two housings are united by rivets so that the housing 33 comes in a central position on one vertical surface of the runway whilst the other housing 34 comes in a corresponding position on the other vertical surface of the runway. The housing 34 serves generally to stiffen the runway structure and also, as hereafter explained, serves for the jointing of adjacent runway sections.

The runner 28 in a vertical position intermediate the axes of the wheels 27 and 29 has a horizontal bore 35 therethrough in which a block 36 is mounted to slide. This block on its end face adjacent the housing 33 has a projecting portion 37 of substantial rectangular section terminating in a number of teeth 38 which latter come at an angle slightly from the vertical and have such disposition, shape and pitch that they constitute a small rack for engaging the helices of the cable 20, the narrower dimension of the rectangle permitting the projection 37 to pass through the split in the housing 33.

39 is a compression spring within the bore 35 which abuts at one end in the hollow interior of the block 36 and at the other end against a washer 40 maintained in the bore 35 by a split pin 41.

The spring 39 presses the block 36 outwardly so that the projecting portion 37 of the block is pressed into engagement with the cable, the other side of the cable consequently being pressed against the flat surface of the D section housing 33.

As a consequence it will be understood that when the cable 20 is moved longitudinally in the split housing 33 it carries along with it the block 36 and consequently the runner 28, the wheels 27 facilitating the action by rolling on the runway 26.

Any desired number of runners 28 with hooks 31, each forming a carrier assembly, can be employed in the conveyer system and these carrier assemblies are positioned on the runway at convenient distances apart to suit the type and size of the component or load to be carried.

The spring 39, in addition to its main function of maintaining full engagement of the carrier assembly with the cable, also acts as a safety device and should there be a stoppage of a carrier (for any reason) the spring 39 compresses and the teeth of the projection 37 jump back from engagement with the cable 20.

Referring to Figs. 5 and 6 which show a corner wheel assembly. This is made up from a bushed wheel 42 of desired diameter which runs freely on a flanged pintle 43. The pintle is formed hollow at 44 to constitute a lubricating cup which has passages leading to the surface of the bush and is closed by a cap 45. The flange of the pintle is attached to a stiffened top plate 46 united with a stiffened bottom plate 47, this latter being connected by nuts, bolts and spacers 48. The stiffening for the top plate can be constituted (and as shown) by straight lengths of runways 26 with their split housings 33 and 34 (although such lengths in such positions have no function except to stiffen the structure).

The runway 26 with the attached split housings 33 and 34, has two straight portions so that the cable which passes through the housings 33 is tangential to a groove 49 for its reception in the periphery of the wheel 42. Between the straight portions 26 of the runway, the housings 34 and 33 are discontinued and the runway 26 itself is curved concentrically with the curvature of the wheel periphery, and this curved portion and parts leading thereto is horizontally slotted at 50 to permit the periphery of the wheel 42 to pass therethrough. It will be understood that in positions such as shown at 22, Fig. 4, corner wheel assemblies such as shown in Figs. 5 and 6 readily can be employed, abutting joints being made as hereafter explained between adjacent portions of the runway 26.

In connection with Figs. 5 and 6 it should be understood the wheel 42 is freely turnable by the engagement of the moving cable 20 therewith. Fig. 7, however, shows in elevation the corner wheel assembly where the wheel is driven. This comprises an electric motor 51 with a vertical shaft which through reduction gearing in a gear casing 52 imparts the final drive to a gear wheel 53 of desired diameter. The method of mounting the gear wheel 53 is not shown but it is pointed out that in diameter and general mounting this wheel is similarly supported to the wheel 42 and is located between a stiffened top plate structure 54 and a stiffened bottom plate structure 55. The arrangement of the runway 26 in relation to the housings 33 and 34 is also similar to that shown in Figs. 5 and 6, the toothed portion of the wheel 53 projecting through the horizontal slot 50 in the runway 26 to enable the cable passing in the straight tangentially arranged portions of the split housing 33 to come into geared relationship with the teeth of the wheel 53 by means of the helical projections of the cable. In this manner when the motor is started, the endless cable is given a positive drive, that is to say the part of the cable coming towards the gear wheel 53 is pulled thereonto and the part of the cable passing away from the gear wheel 53 is pushed therefrom. Thus it will be appreciated the cable works both in tension and compression, in accordance with its primary design.

In some cases at corners it is merely necessary to bend the runway 26 and the two cases concerned are shown in Fig. 4. Regarding the bend 24, the practical method of carrying this into effect is shown in Figs. 8 and 9 where 26 is the runway having riveted thereto the split housings 33 and 34. From these figures it will be appreciated that the cable passing through the split housing 33 is diverted from the straight path by a desired angle, that is to say the structure and cable have an angle of more than 180°.

The other case of a bend without a wheel is indicated at 25 in Fig. 4, the practical construction being in accordance with Figs. 10 and 11. In these latter, 26 is the runway and 33 the split housing for the cable. In this case it is only necessary to utilise portions of the split housing 34 at the extremities of the runway, for jointing purposes with adjacent runway sections.

To accommodate rises and falls in the conveyer, in the first place it should be mentioned that this is not indicated in the layout of Fig. 4 but Figs. 12 and 13 show the unit or element concerned. In these figures, which are both elevations, the runway 26 has an upper running edge for the wheels 27 which at first is horizontal then gradually curves downwardly till it joins a downwardly extending inclined portion. On the vertical surfaces of the runway the housings 33 and 34 are riveted in the usual manner.

It will be appreciated that to the lower end of the runway 26 a straight section can be jointed so that the length of the downward incline is as desired and at its termination a similar unit to that shown in Figs. 12 and 13, but reversed, is employed again to bring the running edge of the runway 26 back to the horizontal.

When the cable is first installed through the various split housings 33 it ultimately is necessary to joint the ends of the cable together. This can be done in various manners but it is necessary that the split housing 33 should be discontinued for a short length for the joint to be made. For this purpose there is provided an insert member indicated by the numeral 56 in Fig. 4 and which is shown in Figs. 14 and 15. The only difference from normal of this runway section shown in Figs. 14 and 15 is that the split housing 33 is replaced by a channel section member 57 which has no outer limiting surface for the cable but upper and lower limitations.

As will be appreciated, the complete conveyer is made up by the cable and carrier assemblies co-operating with runway sections or units of various forms as hereinbefore described, each of these runway sections being adapted to abut the next section so that there is provided a continuous runway and between sections, continuous split housings 33 and 34.

Only one type of joint is necessary to hold the sections together and such a joint is shown in Figs. 16 to 18, and also the position of the joints is represented by the numeral 58 in Fig. 4.

The joint comprises a clamping body in the form of a member 59 of desired length of right-angled channel section the width of the channel being such that it can pass over the exterior of the split housing 34 and its depth such that it can accommodate the full depth of the said split housing 34. This member 59 carries a clamping bar 60 of circular section except for a V groove to accommodate the heads of the rivets. Further, the bar 60 is of such diameter that it can fit snugly within the split housing 34 so that if disposed in the ends of two abutting split housings 34, it constitutes a joining or connecting member therebetween.

Towards the ends this bar 60 has screwed bores 61 to receive the screwed ends of screws 62 which pass through clearance holes towards the ends of the right-angled channel clamping member 59. Thus when the abutting runways 26 with their abutting split housings 34 are in position, the bar 60 being in the ends of the two housings 34, by screws 62 in the clamping member 59 screwing their ends into the tapped bore 61 and the final tightening-up of the screws to a maximum extent, it will be appreciated that the two abutting sections of the runway 26 are firmly clamped together to give the continuous runway.

Advantage is taken of the jointing structure for the suspension of the conveyer and for this purpose the channel clamp 59 has another screw 63, the screwed inner end of which engages in a tapped bore in the channel member 59. The screw 63 can thus be passed through the apertured or eyed end 64 of a support tube 65, it being observed that there is sufficient clearance from the side of this support tube for the passage of the wheels 27 of the carrier assembly.

The upper end of the support tube 65 may be plain or screw-threaded. When the former, it can be held by a clamping screw in a suitable sleeve with a hook portion for taking over a suitable member of a roof truss or the like and when screwed it can engage in a correspondingly threaded member also suitably engaged with a part of the roof truss or other structure. Again, support tubes such as 65 for the making up of conveyers can be provided in various lengths graded by a slight difference in linear dimension to enable a conveyer system readily to be installed under greatly varying conditions.

Generally speaking, support tubes such as 65 are provided in the position of each joint. Thus, in Fig. 4, although the numerals 58 primarily indicate joints, they can also be regarded as indicating support tubes. However, in some cases support tubes may come in other positions and for this purpose a joint structure such as shown in Figs. 16 to 18 can be included in the runway, that is to say the bar 60 inserted into the split housing 34 in a position other than at a joint between two runway sections. Thereby the runway section and the conveyer generally can be supported in such position or positions.

The invention is not limited to the precise forms or details of construction herein described, as these may be varied to suit particular requirements.

What I claim and desire to secure by Letters Patent of the United States of America is:

1. A conveyer, comprising a flexible multi-stranded metal cable with projecting helical turns on its outer surface, means for supporting and confining a length of said cable in a definite linear position while leaving it free for movement, a runway adjacent and parallel with said cable, a runner supported by said runway and adapted to run on said runway, means carried by the runner adjacent the cable for meshing engagement with said helical turns on the cable, means for moving the cable in its supporting and confining means to cause the said engaged helical turns to impart a linear movement to the meshing means of the runner and consequently to the runner along the parallel runway, and means connected to the runner for supporting a load to be conveyed.

2. A conveyer, comprising a flexible multi-stranded metal cable with projecting helical turns on its outer surface, means for supporting and confining a length of said cable in a definite linear position while leaving it free to be moved longitudinally, a runway adjacent and parallel with said cable, a runner supported by said runway and adapted to run on said runway, means carried by the runner adjacent the cable for meshing with said helical turns on the cable, means for moving the cable longitudinally in its supporting and confining means to cause the said engaged helical turns to impart a linear movement to the meshing means of the runner and consequently to the runner along the parallel runway, and means connected to the runner for supporting a load to be conveyed.

3. A conveyer as claimed in claim 2 in which the means for causing the longitudinal movement of the cable includes at least one driven gear wheel in axially fixed position and arranged in meshing engagement with the helical turns on the cable adjacent thereto, to cause the longitudinal movement of the cable both by the wheel pulling the cable thereonto and pushing the cable away therefrom.

4. A conveyer as claimed in claim 1 in which the means for supporting and confining the length of cable comprises a slotted conduit extending over the whole or part of the length of the cable, the slot being so positioned and of such dimensions that it permits the passage of the engaging means of the runner for co-operation with the helical turns of the cable.

5. A conveyer as claimed in claim 1, including a slotted conduit extending over said cable for supporting and confining the latter in a definite linear position while leaving it free to be moved longitudinally, said slotted conduit being attached to said runway and the slot in said conduit being positioned and of such dimensions that it permits the passage of the means provided on the runner for meshing engagement with the helical turns on said cable.

6. A conveyer as claimed in claim 1, including a slotted conduit extending over said cable for supporting and confining the latter in a definite linear position while leaving it free to be moved longitudinally, and in which said conduit is attached to said runway formed by a rectangular rail having its longer sides arranged vertically, said slotted conduit being attached to the longer side of said rail, the slot in said slotted conduit being positioned and of such dimension that it permits the passage of the means provided on the runner for meshing engagement with the helical turns on said cable.

7. A conveyer as claimed in claim 1, including a slotted conduit extending over said cable for supporting and confining the latter in a definite linear position while leaving it free to be moved longitudinally, and in which said conduit is attached to said runway formed by a rectangular rail having its longer sides arranged vertically, said slotted conduit being attached to the longer side of said rail, the slot in said slotted conduit being positioned and of such dimension that it permits the passage of the means provided on the runner for meshing engagement with the helical turns on said cable, said runner being provided with rollers engaging the upper and lower narrow sides of said rectangular rail.

8. A conveyer, comprising a flexible multi-stranded metal cable with helical projections on its outer surface, means for supporting and confining a length of said cable in a definite linear position while leaving it free to be moved longitudinally, a runway adjacent and parallel with said cable, said runway being made in sections which are arranged in abutting relation to form a continuous runway, means for joining adjacent runway sections together, a runner supported by said runway and adapted to run on said runway, means carried by the runner adjacent the cable for meshing engagement with said helical projections of the cable, means for moving the cable in its supporting and confining means to cause the said engaged helical projections to impart a linear movement to the meshing means of the runner and consequently to the runner along the parallel runway, and means connected to the runner for supporting a load to be conveyed.

SYDNEY PILE.